(12) United States Patent
Schlemm et al.

(10) Patent No.: US 12,429,433 B2
(45) Date of Patent: Sep. 30, 2025

(54) METHOD FOR MEASURING SUBSTANCE QUANTITIES IN A MIXTURE

(71) Applicant: TEWS Elektronik GmbH & Co. KG, Hamburg (DE)

(72) Inventors: Udo Schlemm, Hamburg (DE); Hendrik Richter, Hamburg (DE)

(73) Assignee: TEWS Elektronik GmbH & Co. KG, Hamburg (DE)

( * ) Notice: Subject to any disclaimer, the term of this patent is extended or adjusted under 35 U.S.C. 154(b) by 122 days.

(21) Appl. No.: 18/268,696

(22) PCT Filed: Dec. 8, 2021

(86) PCT No.: PCT/EP2021/084803
§ 371 (c)(1),
(2) Date: Jun. 21, 2023

(87) PCT Pub. No.: WO2022/135936
PCT Pub. Date: Jun. 30, 2022

(65) Prior Publication Data
US 2024/0044809 A1  Feb. 8, 2024

(30) Foreign Application Priority Data

Dec. 21, 2020 (DE) ..................... 10 2020 134 372.8

(51) Int. Cl.
*G01N 22/04* (2006.01)
(52) U.S. Cl.
CPC .................................... *G01N 22/04* (2013.01)
(58) Field of Classification Search
CPC ............................... G01N 22/04; G01N 22/00
See application file for complete search history.

(56) References Cited

U.S. PATENT DOCUMENTS

| 10,564,201 B1 * | 2/2020 | Shaffer | ................. G01R 29/10 |
| 10,648,841 B1 * | 5/2020 | Arsalan | ............. G01N 33/2847 |

(Continued)

FOREIGN PATENT DOCUMENTS

| DE | 102011006416 A1 | 10/2012 |
| DE | 102016114286 B3 | 1/2018 |

(Continued)

OTHER PUBLICATIONS

PCT/EP2021/084803, English translation of International Preliminary Report on Patentability, Date of Mailing Mar. 27, 2023 (7 pages).

(Continued)

*Primary Examiner* — Giovanni Astacio-Oquendo
*Assistant Examiner* — Zannatul Ferdous
(74) *Attorney, Agent, or Firm* — Barclay Damon LLP (57) ABSTRACT

A method for measuring substance quantities in a substance mixture including two substances, the method comprises determining a first moisture value for a first of the two substances using a microwave resonator. A second moisture value for the second of the two substances I determined using a microwave resonator. A first measured value and a second measured value are determined for the substance mixture using a microwave resonator. Two scalar factors are determined for two moisture vectors from the first and the second measured values for the substance mixture. The two moisture vectors indicate a direction of a straight line of equal moisture for the first and second substances in a plane of the first and second measured values using the first and second moisture value. A quantity of the first substance and of the second substance in the substance mixture are determined from the two scalar factors.

10 Claims, 6 Drawing Sheets

(56) References Cited

U.S. PATENT DOCUMENTS

| | | | |
|---|---|---|---|
| 2019/0129026 A1* | 5/2019 | Sumi | A61B 6/00 |
| 2019/0175421 A1 | 6/2019 | Schlemm | |
| 2022/0197986 A1* | 6/2022 | Zizi | H04L 63/0861 |

FOREIGN PATENT DOCUMENTS

| | | |
|---|---|---|
| EP | 1669755 A1 | 6/2006 |
| EP | 2207027 A2 | 7/2010 |
| GB | 2489587 A | 10/2012 |
| JP | 2013-510626 A | 3/2013 |
| JP | 2019-100912 A | 6/2019 |
| JP | 2020-126059 A | 8/2020 |

OTHER PUBLICATIONS

Austin et al., A Novel Microwave Sensor to Determine Particulate Blend Composition On-Line, Analytica Chimica Acta 819 (2014) 82-93, Feb. 15, 2014 (12 pages).
PCT/EP2021/084803, International Search Report and Written Opinion, Date of Mailing Apr. 5, 2022 (12 pages).
PCT/EP2021/084803, English translation of International Search Report, Date of Mailing Apr. 5, 2022 (3 pages).
Japanese Patent Office; Notification of Reason(s) for Refusal; Patent Application No. P2023-536186; Dispatch Date: Nov. 12, 2024; (2 pages).
Japanese Patent Office; Notification of Reason(s) for Refusal; Patent Application No. P2023-536186; Dispatch Date: Nov. 12, 2024; (2 pages) English Translation.
John Austin; A Novel Microwave Sensor to Determine Particulate Blend Composition On-line, Analytica Chimica Acta, 2014, vol. 819, pp. 82-93.

* cited by examiner

METHOD FOR MEASURING SUBSTANCE QUANTITIES IN A MIXTURE

CROSS REFERENCE TO RELATED INVENTION

This application is a national stage application pursuant to 35 U.S.C. § 371 of International Application No. PCT/EP2021/0084803, filed on Dec. 8, 2021, which claims priority to, and benefit of, German Patent Application No. 10 2020 134 372.8, filed Dec. 21, 2020, the entire contents of which are hereby incorporated by reference.

FIELD OF TECHNOLOGY

The disclosed invention relates to a method for measuring substance quantities in a substance mixture with two substances using a microwave resonator. The disclosed invention makes it possible to measure substance quantities of two non-dispersive or weakly-dispersive substances in a substance mixture with the aid of the microwave resonance method.

BACKGROUND

In a mixture of two moist substances, the measurement of substance quantities is routinely underdetermined when a two-parameter method is used. The moisture therefore cannot be determined independently of fluctuating substance components in the mixture. When measuring with a microwave resonator in a mixture of substances, it is therefore necessary for one of the substance components to remain constant, for example the sample container or a substrate for the second substance. The influence of the constant substance component can then be generally eliminated from the measured values, for example using an offset.

The present invention seeks to address the measuring problem of relatively strongly fluctuating components of the two substances being present in the substance mixture, but at the same time the moisture only fluctuates relatively slightly or not at all, or the moisture of the individual substances is measured beforehand. A simple plausibility check shows that, based on two measured values of the microwave resonator, the measurement task of determining two substance quantities in the substance mixture is not underdetermined.

BRIEF SUMMARY OF THE INVENTION

The object of the present invention is to provide a method for measuring substance quantities in a substance mixture with two substances using a microwave resonator.

An embodiment of a method according to the invention supplies two substance quantities for a substance mixture. The substances do not necessarily have to be chemically pure substances; instead, substances and their substance quantities are determined in the substance mixture. Since the method according to the invention is not restricted to pure substances, the substance quantities of two substance groups can be distinguished from each other in a substance mixture with more than two substances.

In an embodiment, the method is initially based on the determination of a first moisture value for a first of the two substances and a second moisture value for the second of the two substances. The moisture value for a substance is a common quantity in microwave measuring which is determined, for example, from the quotient of the two measured quantities of the microwave resonator. In a following step, two measured values of the substance mixture are determined using the microwave resonator. In so doing, preferably the shift of the resonance frequency and the widening of the resonance curve are determined.

Using the first and the second moisture value, two scalar factors are calculated for two moisture vectors from the two measured values for the substance mixture. The moisture vectors are vectors which each indicate the direction of a straight line of equal moisture for a substance in a plane of the measured values using the first and the second moisture value. The moisture vectors therefore each denote the direction in the plane of the measured values in which the moisture value is constant for a substance.

In another step, the substance quantities are determined from the two scalar factors. The last step shows that the measuring problem is not undetermined. The accuracy that can be achieved with the measuring method according to the invention significantly depends on and how slightly the moisture of the two substance components fluctuates, or how well the moisture of the two substance components is known. Analytical calculations by the inventor have revealed that strongly varying moisture values for the two substances also positively affects the measuring accuracy. The achieved accuracy in determining the substance quantity is surprising since the substance mixture is measured with the microwave resonator.

In a preferred embodiment, the substance quantities are determined depending on the scalar factors and a temperature of the substance mixture. Experiments have shown that, in addition to the scalar factors, the temperature of the substance mixture is a determinant which is easily accessible in practical use and contributes to increasing the measuring accuracy.

To determine the correlation between the substance quantities and the scalar factors, numerous measurements are used which are then correspondingly evaluated.

In a preferred embodiment of the method, it was revealed that, with regard to the correlation between the substance quantities and scalar factors, it can be assumed that the substance quantity of the first substance depends on the scalar factor of the moisture value for the first substance and the substance quantity of second substance depends on the scalar factor of the moisture value of the second substance. This independence of the two substances in the substance mixture makes it easier to determine the scalar factors. With respect to the moisture values for the two substances, a calibration step can be performed beforehand, in particular when the moisture of the two substances is constant or barely fluctuates. With this calibration step, the moisture values for the two substances in the substance mixture can then be determined very precisely.

Alternatively or in addition to the calibration step for the moisture values, it is also possible to provide at least one additional measuring system that measures the moisture value of a substance before being mixed with the other substance. In this way, one of the moisture values is then precisely available in the measuring method. In a preferred embodiment, two additional measuring systems can be provided that each measure one moisture value for one substance. In this embodiment, the method according to the invention can then also be used for substance mixtures in which the moisture values of the substances forming the substance mixture fluctuate strongly. With the precise detection of moisture values of the individual substances, fluctuations in the measured values resulting from the measurement of the substance mixture can be clearly attributed to the changes in the substance quantity. It has proven advantageous in this context to take into account the fact that two or more measuring systems are used by rescaling the moisture values of the other measuring system(s). The scaling factors can be determined beforehand in a calibration step.

BRIEF DESCRIPTION OF THE DRAWINGS

A preferred design of the invention is explained in greater detail below based on an exemplary embodiment.

DETAILED DESCRIPTION OF THE INVENTION

To better understand the invention, it is useful to briefly consider the physical fundamentals. When using microwave resonators in the field of moisture measuring, two measured quantities A and B are generated. The measured quantity A designates the change in the resonance frequency in the form of a shift of the resonance frequency. The second measured quantity B describes the change in the width of the resonance curve. The physical basis for the measured quantity A is the shortening of the wavelength from the dielectric properties of the substance to be measured. The second effect that leads to the measured quantity B describes the absorption of the microwaves in the sample to be measured.

The polarization P of a dielectric material to be measured results in an electric field B according to its susceptibility $\chi_e$ and the permittivity of vacuum $\varepsilon_0$.

$$\vec{P} = \chi_e \cdot \varepsilon_0 \cdot \vec{E}$$

The electrical susceptibility is a complex number whose real part is designated $\chi_e'$ and whose imaginary part is designated $\chi_e''$.

$$\chi_e = \chi_e' - i \cdot \chi_e''$$

For the correlation with the measured quantities A and B of the microwave resonator, the susceptibility shows that the measured quantity A is proportional to $\chi_e'$ and the measured quantity B is proportional to $\chi_e''$.

$$A \propto \chi_e' = \varepsilon' - 1$$

and $$B \propto \chi_e'' = \varepsilon'',$$

where $\varepsilon'$ designates the real part of the relative permittivity, and $\varepsilon''$ designates this imaginary part.

For the material mixture of several materials $M_1$ to $M_N$, the electrical susceptibility results as the sum of the electrical susceptibilities of materials:

$$\chi_{e,mixture} = \chi_{e,M_1} + \chi_{e,M_2} + \ldots + \chi_{e,M_N}$$

This behavior of the electrical susceptibility for the substance mixture causes the microwave measured values to be additive to each other. This means that the A value of a mixture is the sum of the A values of the individual substances in the mixture. Likewise, the B value is the sum of the individual B values of the substances in the mixture.

$$A_{Mixture} = A_{M_1} + A_{M_2} + \ldots + A_{M_N}$$

and $$B_{Mixture} = B_{M_1} + B_{M_2} + \ldots + B_{M_N}$$

Substance mixtures consisting of two substances will be considered below. In principle, substance mixtures with more than two substances can also be analyzed, and then some substances can be combined and considered together as a single substance.

Figure 1A:
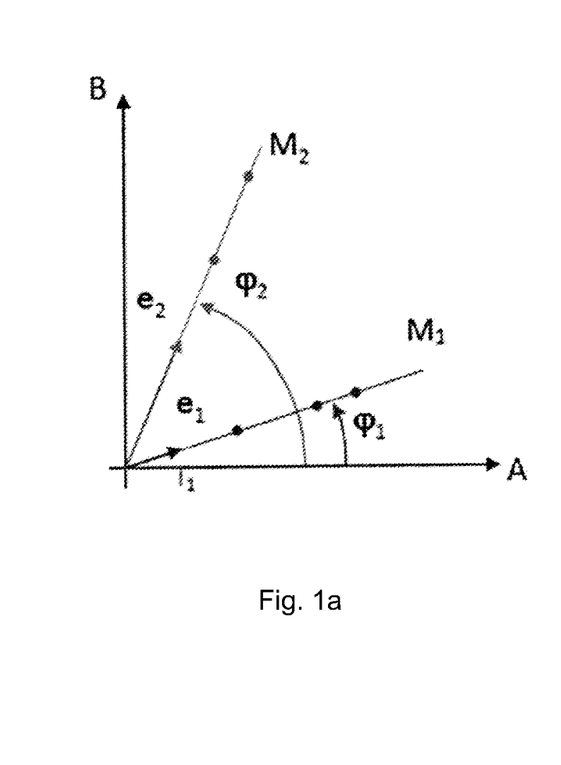
FIGS. 1a and 1b graphically illustrate the measured values in a A-B plane and the associated moisture vectors.
Figure 1B:
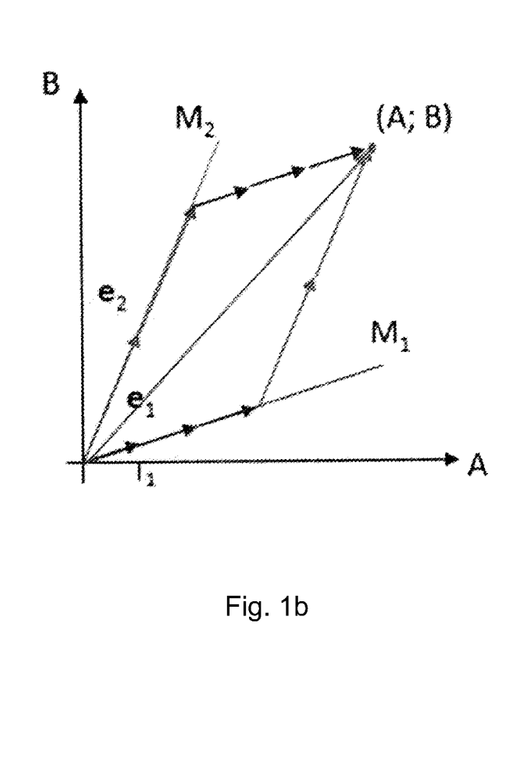

FIGS. 1a and 1b show the plane spanned by the measured values A, B. The lines of equal moisture are drawn for the substances $M_1$ and $M_2$. The slope of the straight lines of equal moisture is denoted by the moisture value $\varphi_1$, $\varphi_2$. The addition of the values expressed in the above equations for the A and B values of the mixture, shown graphically as in FIG. 1b, results in a vectorial addition of the two quantities. This means that the measured values A and B for the mixture can be determined as the vectorial addition of the moisture values of substances $M_1$ and $M_2$. To better analyze this superimposition in the substance mixture, it is advantageous to introduce the moisture vectors vector $e_1$, vector $e_2$. Each point on the line with constant moisture can therefore be depicted by the scalar factor $\theta$ multiplied by the moisture unit vector.

$$\begin{pmatrix} A_i \\ B_i \end{pmatrix} = \theta_i \cdot e_i$$

The index i in the above equation stands for substances 1 and 2.

The above correlation does not apply of course for water or other highly dispersive materials such as for example glycerin. For such highly dispersive substances, the values of constant moisture do not lie on a straight line.

If we recall that, for the mixture, the A value results as the sum of the A values of the substances and the B value results as the sum of the B values of the substances, this correlation can be represented in vectorial notation as follows:

$$\begin{pmatrix} A \\ B \end{pmatrix} = \begin{pmatrix} A_{M_1} \\ B_{M_1} \end{pmatrix} + \begin{pmatrix} A_{M_2} \\ B_{M_2} \end{pmatrix} = \theta_1 \cdot e_1 + \theta_2 \cdot e_2$$

If the moisture vectors are not standardized, they each have the coordinate representation.

$$e_i = \begin{pmatrix} 1 \\ \tan(\varphi_i) \end{pmatrix}$$

Against this backdrop, the measured values A, B can now be written compactly for the substance mixture:

$$\begin{pmatrix} A \\ B \end{pmatrix} = \theta_1 \cdot e_1 + \theta_2 \cdot e_2 = \begin{pmatrix} e_1 & e_2 \end{pmatrix} \cdot \begin{pmatrix} \theta_1 \\ \theta_2 \end{pmatrix} = \begin{pmatrix} 1 & 1 \\ \tan(\varphi_1) & \tan(\varphi_2) \end{pmatrix} \cdot \begin{pmatrix} \theta_1 \\ \theta_2 \end{pmatrix}$$

Under the condition that $\varphi_1$ is not equal to $\varphi_2$, the present equation system can be inverted. In its inverted form, the following correlation results:

$$\begin{pmatrix} \theta_1 \\ \theta_2 \end{pmatrix} = \frac{1}{\tan(\varphi_2) - \tan(\varphi_1)} \cdot \begin{pmatrix} \tan(\varphi_2) & -1 \\ -\tan(\varphi_1) & 1 \end{pmatrix} \cdot \begin{pmatrix} A \\ B \end{pmatrix}$$

The above equation forms a central aspect of the measuring method according to the invention.

From the A, B values measured in the mixture, the scalar factors $\theta_1$, $\theta_2$ can be calculated using the moisture values $\varphi_1$, $\varphi_2$. The above formula also makes it clear that the moisture values $\varphi_1$, $\varphi_2$ are assumed to be either constant or slightly fluctuating during the process. In this case, the $\varphi_1$ and $\varphi_2$ values can be determined beforehand and used for the evaluation.

If, on the other hand, there are strongly fluctuating moisture values for the substances in a measurement application, these can be measured continuously. The advantage of the above correlation between the scalar factors and the measurements in the mixture is that this expression, as an analytical expression, allows the measured moisture values $\varphi_1$ and $\varphi_2$ to be used directly and therefore evaluated. The determined scalar factors now allow the substance quantities $m_1$, $m_2$ to be reliably determined. If we first overlook the temperature dependence, a linear approach can be chosen here:

$$m_i = \alpha_i \cdot \theta_i + \beta_i$$

In this case, the parameters $\alpha$, $\beta$ designate the correlation between the scalar factors and the substance quantity. In principle, the parameters $\alpha$, $\beta$ can be selected depending on the temperature. It has been found that the temperature dependence can also be directly taken into account in a linear fashion. This results in the following correlation:

$$m_i = \alpha_i \cdot \theta_i + \beta_{1,i} \cdot T + \beta_{2,i}.$$

Evaluations of measurements of substance mixtures such as for example the measurement of cellulose and superabsorber content in diaper cores. The determination of the mixture ratio of yarns with artificial and natural fibers, as well as the determination of active charcoal and other granules in cigarette filters have revealed that the determination of the substance quantity using scalar factors is a highly precise method. Qualitatively, this can be made plausible by taking into account that the moisture value (p is independent of density. This density-independent value is included in the moisture vector e, so that the density-dependent influences on the measured quantities A, B are expressed more strongly in the scalar factors. Accordingly, the determination of the scalar factors from the measured A, B values for the mixture is a reliable component which allows the amounts of substance to be determined. Despite this qualitative consideration, the accuracy achieved in determination is surprising.

Figure 2:
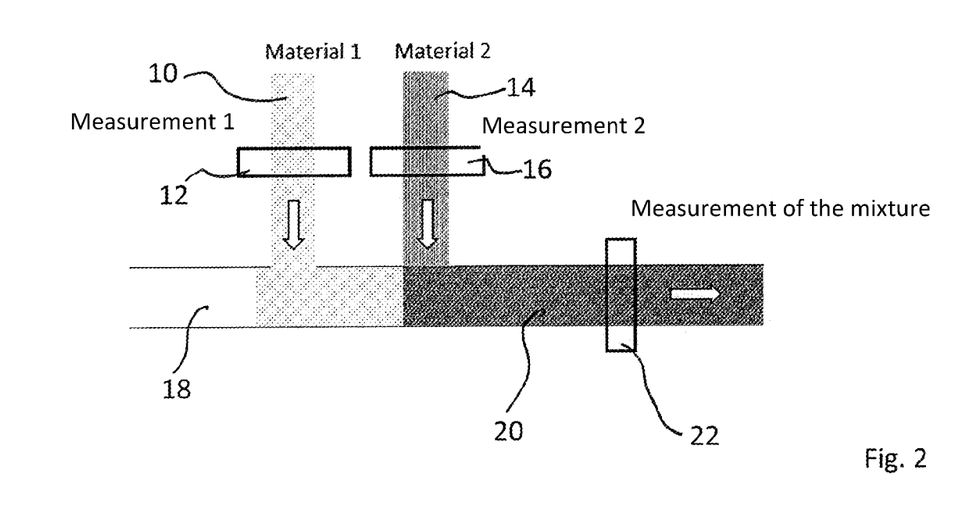
FIG. 2 schematically illustrates an embodiment of a measuring arrangement for prior measurement of the moisture value.

In measuring situations in which the moisture values $\varphi_1$, $\varphi_2$ cannot be determined precisely beforehand for the substances or they fluctuate due to the measuring situation, the measuring arrangement or measuring device shown in FIG. 2 can be used. The measuring arrangement in FIG. 2 shows a schematic view of a material flow 10 of the material $M_1$.

The moisture of the material flow $M_1$ is measured with a schematically portrayed measuring apparatus 12. Likewise, a measuring apparatus 16 measures the moisture value $\varphi_2$ of the material flow 14 of the material $M_2$. Both materials $M_1$, $M_2$ are fed to a feeder 18 where they become a mixture 20 downstream from the feed of the second material 14. The mixture 20 is measured in a measuring arrangement 22. The A and B values determined in this manner can then be converted into the scalar factors $\theta_1$ and $\theta_2$. Based on the always current moisture values $\varphi_1$, $\varphi_2$, the scalar factors can be converted directly.

If the moisture angle is determined with separate measuring apparatuses 12, 16, it has proven to be advantageous to convert the corresponding moisture values before processing.

$$\tan(\varphi_1) = a_1 \cdot \tan(\varphi'_1) + b_1$$

and $$\tan(\varphi_2) = a_2 \cdot \tan(\varphi'_2) + b_2$$

The moisture angles in a dashed line are the moisture angles of the individual devices 12, 16 before mixing. The parameters $a_i$, $b_i$ are calibrated in a manner known per se.

Figure 3:
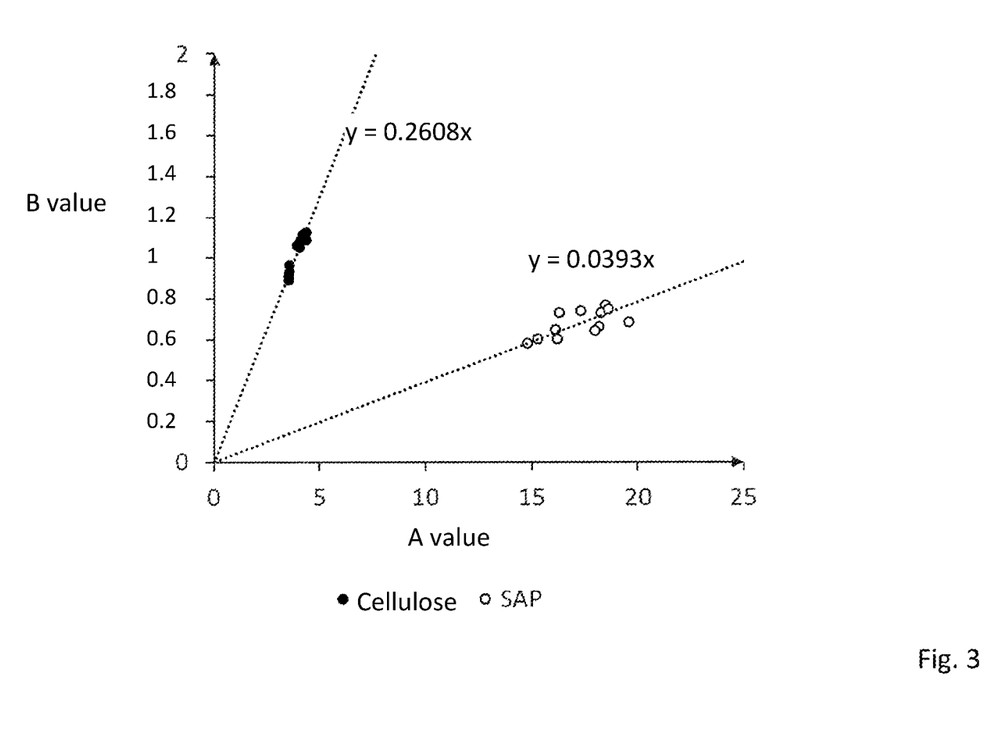
FIG. 3 illustrates an embodiment of A-B diagram of the averages of 12 samples with a cellulose fleece and with an SAP layer.

The above analysis will be repeated below in a specific example with 12 samples of a cellulose fleece and for 12 samples of an SAP layer (layer with superabsorber powder). The averages of the measurement are entered in the A, B plane, where the A and B values describe as explained above a shift in the resonance frequency and the change in width. The regression lines plotted in FIG. 3 reveal a value tan $(\varphi_1) = 0.388$ for SAP, whereas the value for $\tan(\varphi_2)$ for cellulose is 0.2636.

Figure 4:
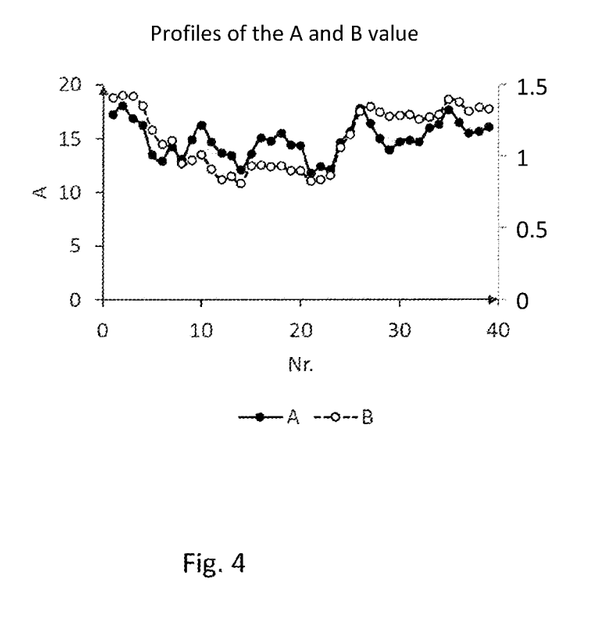
FIG. 4 illustrates an embodiment of a profile of the A, B values.

FIG. 4 shows the A and B values of the diaper core along its profile, wherein the cellulose fleece is sprinkled with SAP in the diaper core. Using the slope of the regression lines, the measured A, B values can each be converted into the scalar factors $\theta_1$ and $\theta_2$.

Figure 5:
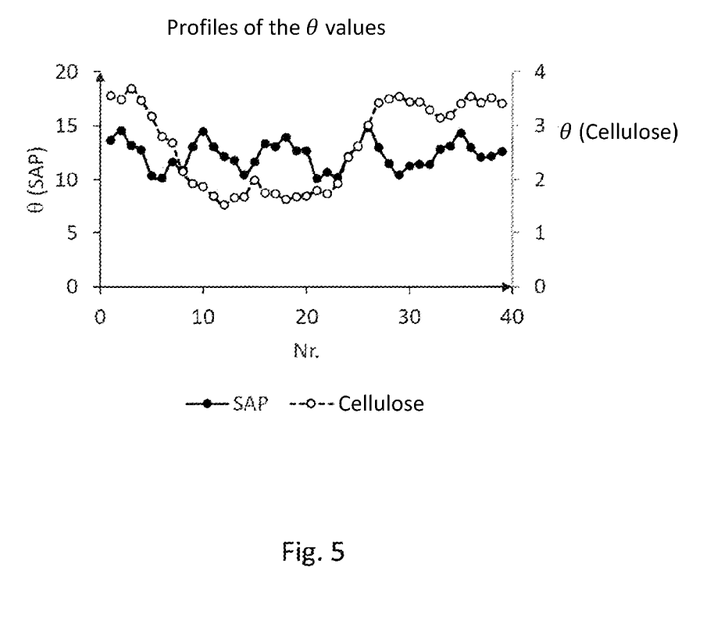
FIG. 5 illustrates an embodiment of a profile of the A, B values divided into 0 values.

FIG. 5 shows the same profile, but this time plotted for the scalar factors $\theta_1$, $\theta_2$. In comparison to the A, B values, it can be seen that the cellulose differs more clearly from the $\theta$ values for SAP especially in the section from 10 to 22.

Figure 6:
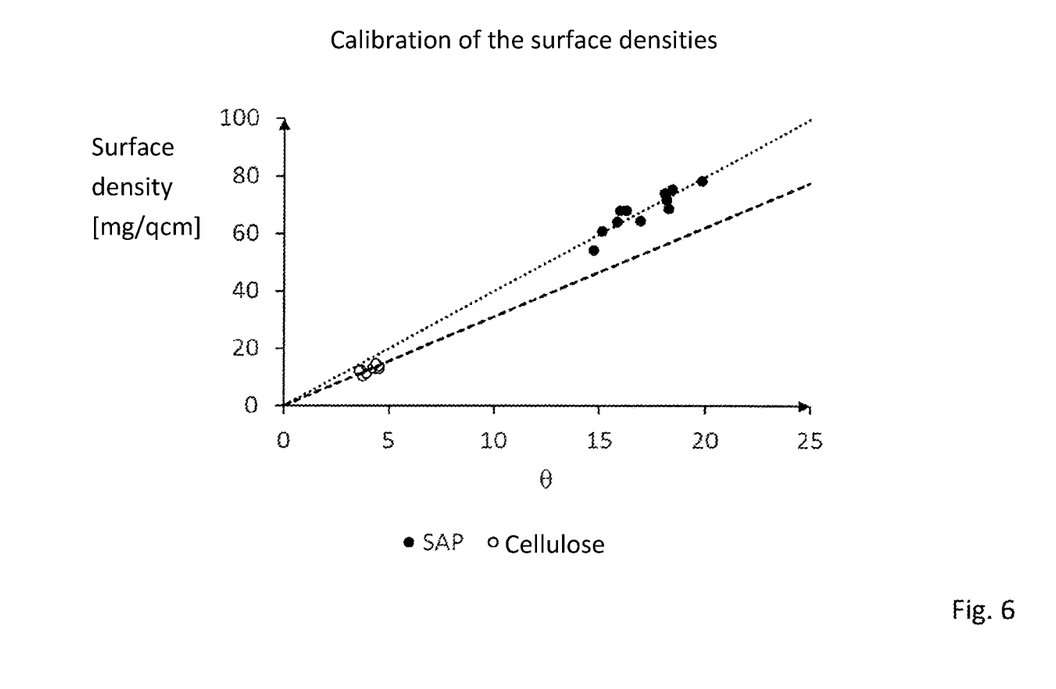
FIG. 6 illustrates an embodiment of a calibration of the surface density.

FIG. 6 shows the calibration of the surface measurement, wherein a temperature-independent calibration was performed in this case. In the calibration, the obtained $\theta$ value was assigned a surface density in milligrams per cm$^2$ in a linear approach. For the equation $$m_i = \alpha_i \cdot \theta_i + \beta_1,$$

the following parameter values result:

$$\alpha_{SAP} = 3.9 \text{ mg/qcm}; \beta_{SAP} = 1 \text{ mg/qcm}$$

$$\alpha_{cellulose} = 3.1 \text{ mg/qcm}; \beta_{cellulose} = 0 \text{ mg/qcm}.$$

Figure 7:
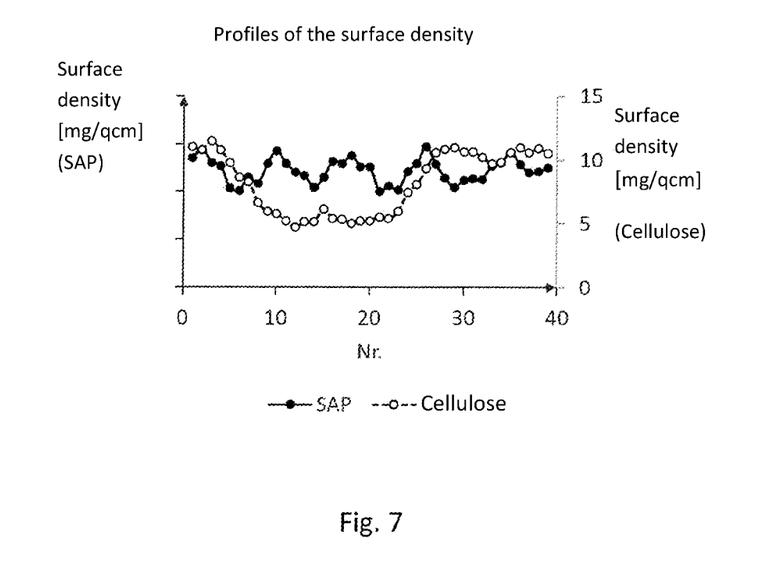
FIG. 7 illustrates an embodiment of a longitudinal profile for SAP and cellulose with the surface density.

Using the values determined in this manner, the measured A, B values can be converted directly into a surface density by converting into the $\theta$ values. The profile shown in FIG. 7 yields the characteristic of the surface density of SAP and cellulose. It can clearly be seen that the surface density for SAP extends almost uniformly over the profile, whereas the cellulose possesses a significantly lower surface density within the range from 10 to 22.

Figure 8:
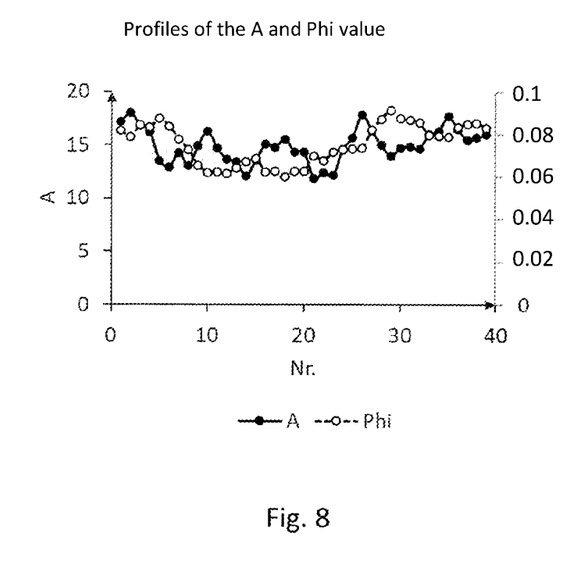
FIG. 8 illustrates an alternative representation of the profile with A and φ values.

By way of comparison, reference is made to the profile of the A and B values in FIG. 4 or to the classic microwave moisture value $\varphi$ in FIG. 8. It can easily be seen that the moisture value $\varphi$ is not a suitable measure for measuring the two substance components independent of each other. In particular, the characteristic low cellulose component in one section cannot be discerned from the filter profile in FIG. 4 and FIG. 8.

The invention claimed is:

1. A method for measuring substance quantities ($m_1$, $m_2$) in a substance mixture including two substances ($M_1$, $M_2$), the method comprising:
    determining a first moisture value ($\phi_1$) for a first of the two substances ($M_1$) using a microwave resonator;
    determining a second moisture value ($\phi_2$) for the second of the two substances ($M_2$) using the microwave resonator;
    measuring a first measured value (A) and a second measured value (B) for the substance mixture using the microwave resonator, wherein the first measured values (A) comprises a resonance frequency shift, and wherein the second measured value (B) comprises a resonance curve width change;
    determining two scalar factors ($\phi_1$, $\phi_2$) for two moisture vectors ($e_1$, $e_2$) from the first and the second measured values (A, B) for the substance mixture, wherein each of the two moisture vectors ($e_1$, $e_2$) indicate a direction of a straight line of equal moisture for the first and second substances ($M_1$, $M_2$) in a plane of the first and second measured values (A, B) using the first and second moisture value ($\phi_1$, $\phi_2$);
    determining a quantity of the first substance and of the second substance ($m_1$, $m_2$) in the substance mixture from the two scalar factors ($\phi_1$, $\phi_2$).

2. The method according to claim 1, further comprising measuring a temperature (T) of the substance mixture, wherein the quantites of the first substance and second substance are determined from the two scalar values and the temperature (T) of the substance mixture.

3. The method according to claim 1, further comprising determining a correlation of the first and second substance quantities ($m_1$, $m_2$) with the two scalar factors ($\theta_1$, $\theta_2$) from one or more measurements of the substance mixture.

4. The method according to claim 3, wherein the correlation of the first and second substance quantities ($m_1$, $m_2$) with the two scalar factors ($\theta_1$, $\theta_2$) is such that:
    the quantity of the first substance depends on a first scalar factor ($\theta_1$) of the moisture value of the first substance ($M_1$); and
    the quantity of the second substance depends on a second scalar factor ($\theta_2$) of the moisture value of the second substance ($M_2$).

5. The method according to claim 1, wherein the two scalar factors ($\theta_1$, $\theta_2$) are determined from numerous individual measurements of the particular substances.

6. The method according to claim 1, wherein the determining of the first and second moisture values ($\varphi_1$, $\varphi_2$) is done during a calibration step.

7. The method according to claim 1, further comprising providing at least one additional measuring system configured to measure one of the first and second substances before being combined into the substance mixture.

8. The method according to claim 7, wherein the at least one additional measuring system is configured to measure one of the first and second moisture value.

9. The method according to claim 8, wherein the one of the first and second moisture value is rescaled, wherein parameters are calibrated for the rescaling.

10. A measuring device configured to perform the method of claim 1, wherein the measuring device comprises the microwave resonator and is configured to accept the substance mixture.

* * * * *